United States Patent
Liu et al.

(10) Patent No.: US 12,356,400 B2
(45) Date of Patent: Jul. 8, 2025

(54) COMMUNICATION METHOD AND COMMUNICATION APPARATUS

(71) Applicant: Huawei Technologies Co., Ltd., Shenzhen (CN)

(72) Inventors: Rongkuan Liu, Shanghai (CN); Ting Wang, Shanghai (CN); Peng Zhang, Shanghai (CN); Hua Xu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 323 days.

(21) Appl. No.: 17/853,504

(22) Filed: Jun. 29, 2022

(65) Prior Publication Data
US 2022/0338228 A1 Oct. 20, 2022

Related U.S. Application Data

(63) Continuation of application No. PCT/CN2019/130190, filed on Dec. 30, 2019.

(51) Int. Cl.
*H04W 72/1273* (2023.01)
*H04L 1/00* (2006.01)
*H04W 72/20* (2023.01)

(52) U.S. Cl.
CPC ....... *H04W 72/1273* (2013.01); *H04L 1/0038* (2013.01); *H04W 72/20* (2023.01)

(58) Field of Classification Search
CPC .. H04W 72/1273; H04W 72/20; H04L 1/0038
See application file for complete search history.

(56) References Cited

U.S. PATENT DOCUMENTS 10,206,215 B2 * 2/2019 Kim ..................... H04W 52/383
11,785,624 B2 * 10/2023 Su ......................... H04W 76/11
370/329
(Continued)

FOREIGN PATENT DOCUMENTS

CN 108512576 A 9/2018
CN 109217989 A 1/2019
(Continued)

OTHER PUBLICATIONS

"3rd Generation Partnership Project; Technical Specification Group Radio Access Network; NR; Physical layer procedures for control (Release 15)," 3GPP TS 38.213 V15.7.0, pp. 1-108, 3rd Generation Partnership Project, Valbonne, France (Sep. 2019).
(Continued)

*Primary Examiner* — Michael J Moore, Jr.
(74) *Attorney, Agent, or Firm* — Leydig, Voit & Mayer, Ltd.

(57) ABSTRACT

A communication method includes: a first terminal device receives a first message from a network device. The first message includes first information and second information, the first information is used to indicate a first search space, the second information is used to indicate a first cooperation group identifier, and a first cooperation group includes the first terminal device and a second terminal device. The first terminal device obtains first control information from the first search space based on the first information and the second information. The first control information is used to schedule downlink data of the second terminal device.

20 Claims, 8 Drawing Sheets

(56) References Cited

U.S. PATENT DOCUMENTS

| | | | |
|---|---|---|---|
| 11,871,429 B2* | 1/2024 | Lin | H04L 5/0096 |
| 11,937,250 B2* | 3/2024 | Jiang | H04W 52/0216 |
| 2016/0044638 A1* | 2/2016 | Gao | H04L 5/0053 |
| | | | 370/280 |
| 2016/0249337 A1* | 8/2016 | Liang | H04W 48/12 |
| 2016/0381672 A1* | 12/2016 | Kim | H04W 72/51 |
| | | | 370/329 |
| 2017/0094653 A1* | 3/2017 | Jitsukawa | H04W 76/14 |
| 2017/0126358 A1* | 5/2017 | Rong | H04L 1/0046 |
| 2018/0035411 A1* | 2/2018 | Wang | H04W 72/23 |
| 2019/0141711 A1* | 5/2019 | Fu | H04L 1/0038 |
| 2020/0163155 A1* | 5/2020 | Lee | H04W 72/23 |
| 2020/0178292 A1* | 6/2020 | Kim | H04W 72/23 |
| 2020/0322946 A1* | 10/2020 | Jiang | H04W 72/51 |
| 2021/0105633 A1* | 4/2021 | Vaidya | H04W 76/27 |
| 2021/0258962 A1* | 8/2021 | Kuang | H04L 27/0006 |
| 2022/0149981 A1* | 5/2022 | Zhou | H04W 72/044 |
| 2022/0159683 A1* | 5/2022 | Islam | H04W 72/1268 |
| 2022/0201770 A1* | 6/2022 | Xu | H04B 7/18513 |
| 2022/0330328 A1* | 10/2022 | Liu | H04W 56/001 |
| 2022/0338228 A1* | 10/2022 | Liu | H04W 72/1273 |

FOREIGN PATENT DOCUMENTS

| | | |
|---|---|---|
| CN | 109587729 A | 4/2019 |
| CN | 110024319 A | 7/2019 |
| EP | 3125643 A1 | 2/2017 |
| EP | 3547780 A1 | 10/2019 |
| WO | 2019080486 A1 | 5/2019 |
| WO | 2019192018 A1 | 10/2019 |

OTHER PUBLICATIONS

"3rd Generation Partnership Project; Technical Specification Group Radio Access Network; NR; Physical channels and modulation (Release 15)," 3GPP TS 38.211 V15.7.0, pp. 1-97, 3rd Generation Partnership Project, Valbonne, France (Sep. 2019).

"Resource scheme of FeD2D Relay," 3GPP TSG RAN WG1 Meeting #90, Prague, Czech Republic, R1-1712918, Total 5 pages, 3rd Generation Partnership Project, Valbonne, France (Aug. 21-25, 2017).

* cited by examiner

COMMUNICATION METHOD AND COMMUNICATION APPARATUS

CROSS-REFERENCE TO RELATED APPLICATIONS

This application is a continuation of International Application No. PCT/CN2019/130190, filed on Dec. 30, 2019, the disclosure of which is hereby incorporated by reference in its entirety.

TECHNICAL FIELD

Embodiments of this application relate to the communication field, and in particular, to a communication method and a communication apparatus.

BACKGROUND

A fifth generation (5G) communication system supports various new wireless service types such as an internet of things and autonomous driving. The 5G communication system further supports user cooperation transmission. Through the user cooperation transmission, a capacity of the communication system and coverage of a network can be significantly improved, and load at a base station end can be further reduced.

In a conventional technology, a base station may transmit a physical downlink control channel (PDCCH) by using a search space, and a terminal device may perform blind detection in the search space to obtain downlink control information (DCI) carried on the PDCCH. Existing search space is classified into common search space and user equipment (UE)-specific search space.

In a cooperation transmission scenario, the base station may scramble the DCI by using an identifier of a cooperation group, and the terminal device may perform blind detection in all UE-specific search space of the terminal device and all common search space based on the identifier of the cooperation group, to obtain the DCI sent by the base station. Consequently, complexity of blind detection performed by the terminal device is high.

SUMMARY

Embodiments of this application provide a communication method and a communication apparatus, to reduce complexity of blind detection performed by a terminal device in a cooperation transmission scenario.

According to a first aspect, a communication method is provided. The method includes: a first terminal device receives a first message from a network device. The first message includes first information and second information, the first information is used to indicate first search space, the second information is used to indicate a first cooperation group identifier, and a first cooperation group includes the first terminal device and a second terminal device. The first terminal device obtains first control information from the first search space based on the first information and the second information. The first control information is used to schedule downlink data of the second terminal device. In other words, the first control information is used to indicate the downlink data of the second terminal device. It should be noted that the downlink data of the second terminal device means that a destination address of the downlink data is the second terminal device. In this application, downlink data of a terminal device means that a destination address of the downlink data is the terminal data. Details are not described below.

In the method provided in this embodiment of this application, a terminal device may obtain, by using a message, a cooperation group identifier and search space (for example, the first search space in this embodiment of this application) that are configured by the network device, and then perform, based on the cooperation group identifier, blind detection in the search space configured by using the message, to obtain downlink control information sent by the network device. In the method provided in this embodiment of this application, a cooperation group is associated with the search space by using the first message, and the terminal device does not need to perform blind detection in all UE-specific search space of the terminal device and all common search space, and only needs to perform, based on the cooperation group identifier, blind detection in the first search space indicated by the network device, to obtain the downlink control information sent by the network device. Compared with a method in a conventional technology, the method provided in this embodiment of this application greatly reduces complexity of blind detection performed by the terminal device.

With reference to the first aspect, in a first possible implementation of the first aspect, the method further includes: the first terminal device receives the downlink data of the second terminal device from the network device based on the first control information. The first terminal device forwards, to the second terminal device, the downlink data received from the network device.

In the method provided in this embodiment of this application, the first terminal device may receive, based on control information obtained from the search space, the downlink data sent by the network device, and assist the network device in forwarding the downlink data to the second terminal device. The terminal device obtains the downlink control information by using the search space. This improves transmission security in a cooperation transmission scenario.

With reference to the first aspect or the first possible implementation of the first aspect, in a second possible implementation of the first aspect, the first search space is common search space, or the first search space is search space specific to the first cooperation group.

This embodiment of this application further provides possible examples of the search space used in the cooperation transmission scenario. Existing common search space may be used to transmit the DCI in the cooperation transmission scenario, and no new search space needs to be defined.

Alternatively, search space specific to the cooperation transmission scenario may be defined. The specific search space is used to transmit DCI related to a cooperation group. The specific search space is used only to transmit control information of a terminal device in the cooperation group. Compared with that the common search space is used to transmit control information related to the cooperation group, this reduces a collision between control channels.

With reference to the first aspect or the first or the second possible implementation of the first aspect, in a third possible implementation of the first aspect, the second information is associated with the first search space.

In this embodiment of this application, when the first search space is the common search space, the first search space and the cooperation group identifier may be configured in an IE of an RRC message (for example, the first message in this embodiment of this application). It may be understood that the second information is associated with the first search space, and the first search space may be used to transmit DCI related to the cooperation group indicated by the second information. The first search space is associated with the cooperation group, so that the terminal device only needs to perform blind detection in search space specific to the cooperation group, to obtain the DCI sent by the network device. This reduces the complexity of the blind detection.

With reference to any one of the first aspect or the first to the third possible implementations of the first aspect, in a fourth possible implementation of the first aspect, that the first terminal device obtains first control information from the first search space based on the first information and the second information includes: The first terminal device in the first search space indicated by the first information receives the first control information scrambled by using the first cooperation group identifier; and the first terminal device descrambles, based on the second information, the first control information scrambled by using the first cooperation group identifier.

This embodiment of this application further provides a specific implementation of obtaining the control information from the first search space by the first terminal device based on the first information and the second information. The network device sends the control information in search space, and all terminal devices in the cooperation group can obtain, from the search space, the downlink control information sent by the network device. This reduces signaling overheads.

With reference to any one of the first aspect or the first to the fourth possible implementations of the first aspect, in a fifth possible implementation of the first aspect, a format of the first control information is specific to cooperation transmission.

In this embodiment of this application, control information specific to the cooperation transmission may be defined, and the network device may transmit the control information in such a format by using the search space. An existing control information format may not satisfy a requirement of the cooperation transmission, and the control information specific to the cooperation transmission is defined, so that cooperation transmission can be better performed.

With reference to any one of the first aspect or the first to the fifth possible implementations of the first aspect, in a sixth possible implementation of the first aspect, the first message further includes third information, and the third information is used to indicate a control information format specific to the cooperation transmission.

In this embodiment of this application, the terminal device may further determine the format of the first control information by using an RRC message (for example, the first message in this embodiment of this application) sent by the network device. Different formats of control information indicate different payload sizes of the control information. The terminal device performs blind detection based on the format of the first control information, and determines, based on a payload size corresponding to the format, whether the first control information is received. When a payload size of a received message matches a payload size corresponding to the control information format specific to the cooperation transmission, it is determined that the first control information is received by using the first search space.

With reference to any one of the first aspect or the first to the sixth possible implementations of the first aspect, in a seventh possible implementation of the first aspect, the first cooperation group identifier is a radio network temporary identifier RNTI, and the first cooperation group identifier is different from an RNTI of the first terminal device and an RNTI of the second terminal device; or the first cooperation group identifier is the same as an RNTI of the second terminal device.

This embodiment of this application provides a possible implementation of the cooperation group identifier. The cooperation group identifier may be an RNTI, but is different from RNTIs of a CUE and a TUE. Allocating the specific RNTI to the cooperation group can avoid confusion with the RNTIs of the terminal devices. Alternatively, the cooperation group identifier may be an RNTI of a TUE, and the cooperation group identifier does not need to be additionally configured, so that an available sequence value of an RNTI can be saved.

With reference to any one of the first aspect or the first to the seventh possible implementations of the first aspect, in an eighth possible implementation of the first aspect, the first information includes a first offset and information about the common search space, and the first offset is an offset between the first search space and the common search space.

In this embodiment of this application, when the network device transmits the control information by using the search space specific to the cooperation group, the terminal device may accurately determine, based on the first offset and the information about the common search space, the search space specific to the cooperation group.

According to a second aspect, a communication method is provided. The method includes: A network device determines first information and second information. The first information is used to indicate first search space, the second information is used to indicate a first cooperation group identifier, and a first cooperation group includes a first terminal device and a second terminal device. The network device sends a first message to the first terminal device. The first message includes the first information and the second information.

With reference to the second aspect, in a first possible implementation of the second aspect, the first search space is common search space, or the first search space is search space specific to the first cooperation group.

With reference to the second aspect or the first possible implementation of the second aspect, in a second possible implementation of the second aspect, the second information is associated with the first search space.

With reference to the second aspect or the first or the second possible implementation of the second aspect, in a third possible implementation of the second aspect, a format of first control information is specific to cooperation transmission.

With reference to any one of the second aspect or the first to the third possible implementations of the second aspect, in a fourth possible implementation of the second aspect, the first message further includes third information, and the third information is used to indicate a control information format specific to the cooperation transmission.

With reference to any one of the second aspect or the first to the fourth possible implementations of the second aspect, in a fifth possible implementation of the second aspect, the first cooperation group identifier is a radio network temporary identifier RNTI, and the first cooperation group identifier is different from an RNTI of the first terminal device and an RNTI of the second terminal device; or the first cooperation group identifier is the same as an RNTI of the second terminal device.

With reference to any one of the second aspect or the first to the fifth possible implementations of the second aspect, in a sixth possible implementation of the second aspect, the first information includes a first offset and information about the common search space, and the first offset is an offset between the first search space and the common search space.

According to a third aspect, a communication apparatus is provided, and includes: a communication unit, configured to receive a first message from a network device, where the first message includes first information and second information, the first information is used to indicate first search space, the second information is used to indicate a first cooperation group identifier, and a first cooperation group includes a first terminal device and a second terminal device; and a processing unit, configured to obtain first control information from the first search space based on the first information and the second information, where the first control information is used to schedule downlink data of the second terminal device. In other words, the first control information is used to indicate the downlink data of the second terminal device.

With reference to the third aspect, in a first possible implementation of the third aspect, the processing unit is further configured to receive the downlink data of the second terminal device from the network device by using the communication unit based on the first control information. The communication unit is further configured to forward the downlink data to the second terminal device.

With reference to the third aspect or the first possible implementation of the third aspect, in a second possible implementation of the third aspect, the first search space is common search space, or the first search space is search space specific to the first cooperation group.

With reference to the third aspect or the first or the second possible implementation of the third aspect, in a third possible implementation of the third aspect, the second information is associated with the first search space.

With reference to any one of the third aspect or the first to the third possible implementations of the third aspect, in a fourth possible implementation of the third aspect, the processing unit is specifically configured to receive, by using the communication unit in the first search space indicated by the first information, the first control information scrambled by using the first cooperation group identifier. The processing unit is further configured to descramble, based on the second information, the first control information scrambled by using the first cooperation group identifier.

With reference to any one of the third aspect or the first to the fourth possible implementations of the third aspect, in a fifth possible implementation of the third aspect, a format of the first control information is specific to cooperation transmission.

With reference to any one of the third aspect or the first to the fifth possible implementations of the third aspect, in a sixth possible implementation of the third aspect, the first message further includes third information, and the third information is used to indicate a control information format specific to the cooperation transmission.

With reference to any one of the third aspect or the first to the sixth possible implementations of the third aspect, in a seventh possible implementation of the third aspect, the first cooperation group identifier is a radio network temporary identifier RNTI, and the first cooperation group identifier is different from an RNTI of the first terminal device and an RNTI of the second terminal device; or the first cooperation group identifier is the same as an RNTI of the second terminal device.

With reference to any one of the third aspect or the first to the seventh possible implementations of the third aspect, in an eighth possible implementation of the third aspect, the first information includes a first offset and information about the common search space, and the first offset is an offset between the first search space and the common search space.

According to a fourth aspect, a communication apparatus is provided, and includes: a processing unit, configured to determine first information and second information, where the first information is used to indicate first search space, the second information is used to indicate a first cooperation group identifier, and a first cooperation group includes a first terminal device and a second terminal device; and a communication unit, configured to send a first message to the first terminal device, where the first message includes the first information and the second information.

With reference to the fourth aspect, in a first possible implementation of the fourth aspect, the first search space is common search space, or the first search space is search space specific to the first cooperation group.

With reference to the fourth aspect or the first possible implementation of the fourth aspect, in a second possible implementation of the fourth aspect, the second information is associated with the first search space.

With reference to the fourth aspect or the first or the second possible implementation of the fourth aspect, in a third possible implementation of the fourth aspect, a format of first control information is specific to cooperation transmission.

With reference to any one of the fourth aspect or the first to the third possible implementations of the fourth aspect, in a fourth possible implementation of the fourth aspect, the first message further includes third information, and the third information is used to indicate a control information format specific to the cooperation transmission.

With reference to any one of the fourth aspect or the first to fourth possible implementations of the fourth aspect, in a fifth possible implementation of the fourth aspect, the first cooperation group identifier is a radio network temporary identifier RNTI, and the first cooperation group identifier is different from an RNTI of the first terminal device and an RNTI of the second terminal device; or the first cooperation group identifier is the same as an RNTI of the second terminal device.

With reference to any one of the fourth aspect or the first to the fifth possible implementations of the fourth aspect, in a sixth possible implementation of the fourth aspect, the first information includes a first offset and information about the common search space, and the first offset is an offset between the first search space and the common search space.

It should be noted that when the communication apparatus is a network device, a terminal device, or a combined component that can implement functions of the network device and the terminal device, the communication unit may be a transceiver, and may include an antenna, a radio frequency circuit, and the like, where the transceiver may be a transmitter and a receiver that are integrated; and the processing module may be a processor, for example, a baseband chip. When the communication apparatus is a component having functions of the network device and the terminal device, the communication unit may be a radio frequency unit, and the processing module may be a processor. When the communication apparatus is a chip system, the communication unit may be an input/output interface of the chip system, and the processing module may be a processor, for example, a central processing unit (CPU), of the chip system.

According to a fifth aspect, a communication apparatus is provided, and includes at least one processor and a memory. The at least one processor is coupled to the memory. The memory is configured to store a computer program.

The at least one processor is configured to execute the computer program stored in the memory, so that the apparatus performs the method according to any one of the second aspect or the implementations of the second aspect or the method according to any one of the first aspect or the implementations of the first aspect.

According to a sixth aspect, a computer-readable storage medium is provided. The computer-readable storage medium stores instructions. When the computer-readable storage medium runs on the communication apparatus according to any one of the third aspect or the implementations of the third aspect or any one of the sixth aspect or the implementations of the sixth aspect, the communication apparatus is enabled to perform the communication method according to any one of the first aspect or the implementations of the first aspect.

According to a seventh aspect, a computer-readable storage medium is provided. The computer-readable storage medium stores instructions. When the computer-readable storage medium runs on the communication apparatus according to any one of the fourth aspect or the implementations of the fourth aspect, the communication apparatus is enabled to perform the communication method according to any one of the second aspect or the implementations of the second aspect.

According to an eighth aspect, a wireless communication apparatus is provided. The communication apparatus includes a processor for example, used in the communication apparatus, to implement the method according to any one of the first aspect or the implementations of the first aspect. The communication apparatus may be, for example, a chip system. In a feasible implementation, the chip system further includes a memory. The memory is configured to store program instructions and data that are necessary for implementing the function in the method in the first aspect.

According to a ninth aspect, a wireless communication apparatus is provided. The communication apparatus includes a processor for example, used in the communication apparatus, to implement the method according to any one of the second aspect or the implementations of the second aspect or the function in the method. The communication apparatus may be, for example, a chip system. In a feasible implementation, the chip system further includes a memory. The memory is configured to store program instructions and data that are necessary for implementing the function in the method in the second aspect.

The chip system in the foregoing aspects may be a system on chip (SOC), or may be a baseband chip or the like. The baseband chip may include a processor, a channel encoder, a digital signal processor, a modem, an interface module, and the like.

According to a tenth aspect, a communication system is provided, and includes a network device, a first terminal device, and a second terminal device.

The network device is configured to determine first information and second information. The first information is used to indicate first search space, the second information is used to indicate a first cooperation group identifier, and a first cooperation group includes the first terminal device and the second terminal device.

The network device is further configured to send a first message to the first terminal device. The first message includes the first information and the second information.

The first terminal device is configured to receive the first message from the network device, and obtain first control information from the first search space based on the first information and the second information. The first control information is used to schedule downlink data of the second terminal device. In other words, the first control information is used to indicate the downlink data of the second terminal device.

The first terminal device is further configured to receive the downlink data of the second terminal device based on the first control information, and send the downlink data to the second terminal device.

For a specific execution process of the terminal device, refer to any one of the first aspect or the possible implementations of the first aspect. Details are not described herein again. For a specific execution process of the network device, refer to any one of the second aspect or the possible implementations of the second aspect. Details are not described herein again.

DESCRIPTION OF EMBODIMENTS

The following describes technical solutions in this application with reference to accompanying drawings.

First, terms in embodiments of this application are explained and described.

(1) User Cooperation Transmission

The user cooperation transmission means that a terminal device assists another terminal device in completing data transmission, to significantly improve a system capacity and network coverage. For example, if a terminal device 1 is located at a cell edge with weak coverage, a base station may send data to a terminal device 2 in an area with strong coverage, and the terminal device 2 forwards the data to the terminal device 1.

Figure 1:
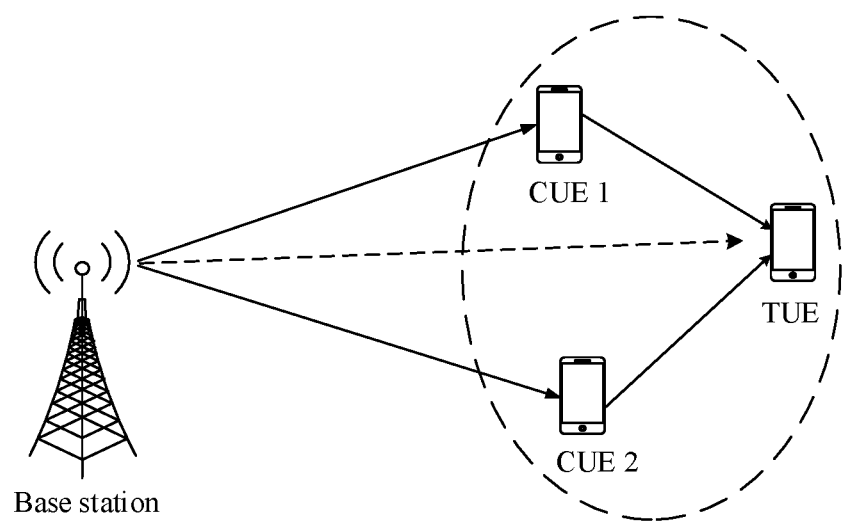
FIG. 1 is a schematic diagram of a cooperation transmission scenario according to an embodiment of this application.

FIG. 1 is a scenario of downlink user cooperation transmission. A base station may send data to a cooperation user equipment (CUE) and a target user equipment (TUE). The CUE may send the received data to the TUE through a sidelink. The TUE may jointly decode the data from the base station and the data from the CUE, to improve data receiving performance.

For example, refer to FIG. 1. The base station prepares the data that needs to be sent to the TUE, and sends the data to the TUE, a CUE 1, and a CUE 2. The CUE 1 and the CUE 2 send the received data to the TUE. The TUE may jointly decode the data from the base station, the data from the CUE 1, and the data from the CUE 2.

Figure 2:
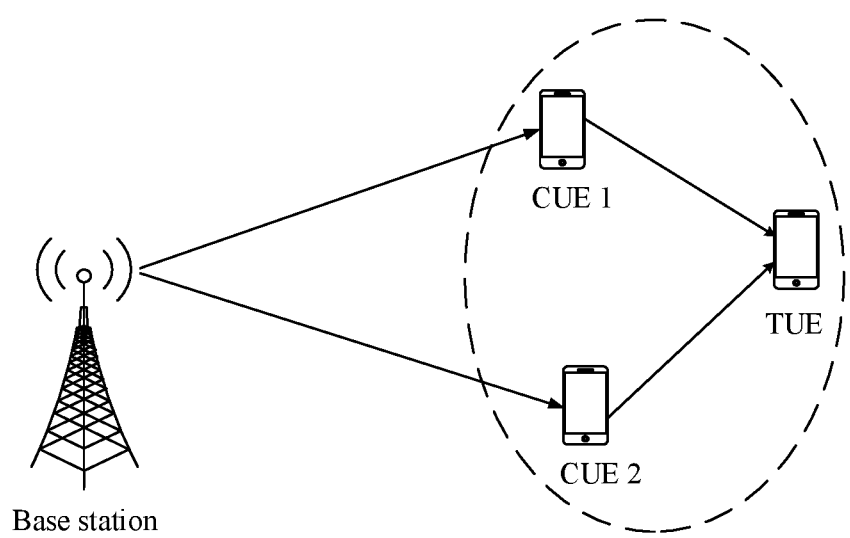
FIG. 2 is another schematic diagram of a cooperation transmission scenario according to an embodiment of this application.

FIG. 2 is another scenario of downlink user cooperation transmission. A base station sends data only to a CUE. The CUE may send the received data to a TUE through a sidelink. The TUE receives the data from the CUE.

For example, refer to FIG. 2. T base station prepares the data that needs to be sent to the TUE, and sends the data to a CUE 1 and a CUE 2. The CUE 1 and the CUE 2 send the received data to the TUE. The TUE may jointly decode the data from the CUE 1 and the data from the CUE 2.

In a downlink user cooperation transmission scenario, a user cooperation group (UC group) includes a TUE and several CUEs serving the TUE. For example, a user cooperation group includes the TUE, the CUE 1, and the CUE 2 in FIG. 1 or FIG. 2. It should be noted that one user cooperation group includes only one TUE. A UE may be a TUE in a user cooperation group, or may be a CUE in another user cooperation group. There may be a plurality of different user cooperation groups in a same cell.

(2) RNTI (Radio Network Temporary Identifier)

The RNTI is an identifier that is agreed on by a user equipment and a base station and that is used to distinguish different user equipment from the particular user equipment. A C-RNTI (cell-RNTI) is a common RNTI, and may represent service information of the user equipment.

(3) Physical Downlink Control Channel (PDCCH)

Generally, both receiving downlink data by a terminal device and sending uplink data by the terminal device need scheduling performed by a network device. The network device may schedule the uplink data or the downlink data of the terminal device by using a PDCCH. For example, the PDCCH may carry downlink control information (DCI). The terminal device may receive data on a physical downlink shared channel (PDSCH) based on the DCI, or send data on a physical uplink shared channel (PUSCH) based on the DCI.

The DCI has a plurality of formats. The DCI may indicate cell-level information, or may indicate UE-level information. The cell-level information is common information of all UEs in a cell, and the UE-level information is applicable only to a specific UE, and is not applicable to another UE in the cell. One PDCCH can carry only one piece of DCI in a specific format. The PDCCH is transmitted on n consecutive control channel elements (CCE), and each CCE includes a specific quantity of resource element groups (REG). Aggregation levels (AL) of PDCCHs may vary with formats of the DCI carried on the PDCCH. The aggregation level indicates a quantity of the consecutive CCEs occupied by the PDCCH. For example, aggregation levels (ALs) corresponding to DCI formats {0, 1, 2, 3} are {1, 2, 4, 8}.

(4) Search Space

Before successfully receiving a PDCCH, a terminal device needs to monitor a set of PDCCH candidates. That is, the terminal device attempts to decode each PDCCH in the set based on a DCI format for monitoring. If the terminal device successfully decodes a PDCCH in the set of PDCCH candidates in a monitoring process, it means that the terminal device successfully receives the PDCCH.

It should be noted that the set of PDCCH candidates may be referred to as the search space. The search space is classified into common search space (CSS) and UE-specific search space (USS). In a conventional technology, the common search space is used to transmit cell-level DCI, and all UEs in a cell may perform blind detection in the common search space to obtain the cell-level DCI, for example, control information related to paging, a random access (RA) response, a broadcast control channel (BCCH), and the like.

The UE-specific search space is used to transmit UE-level DCI, and only a specific UE can obtain, through blind detection, DCI sent by a base station to the UE. For example, the UE-level DCI is control information related to a downlink shared channel (DL-SCH), an uplink shared channel (UL-SCH), and the like.

The base station may configure a search space-related parameter, for example, a search space index, an associated control resource set, a PDCCH monitoring periodicity, PDCCH monitoring duration in each PDCCH monitoring periodicity, a quantity of PDCCH candidates at each CCE aggregation level, and the DCI format for detection, by using a radio resource control (RRC) message. The terminal device may determine, based on the search space-related parameter, search space for performing blind detection.

In addition, the terminal device may determine the search space by using a CCE occupied by the search space. Specifically, CCEs distributed on entire bandwidth may be numbered, to determine an index of the CCE occupied by the search space. Alternatively, control resource sets (CORESET) may be obtained through division on bandwidth, and CCEs distributed on one CORESET are separately numbered. The search space may be associated with a CORESET, and the terminal device may determine the search space by using an index, on the CORESET, of the CCE occupied by the search space.

For example, an index of a CCE occupied by search space associated with a CORESET p satisfies the following formula (1):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad \text{formula (1)}$$

In a case, to monitor the PDCCH in a primary cell, a carrier indicator field may be configured for a UE by using CrossCarrierSchedulingConfig. In this case, $n_{CI}$ is a carrier indicator field value, and is used to indicate the carrier indicator field. In another case including a case of any CSS, $n_{CI}=0$.

$n_{s,f}^{\mu}$ is a slot number, L is an aggregation level, and $m_{s,n_{CI}}$ is a search space index.

When the search space associated with the CORESET p is the CSS, $Y_{p,n_{s,f}^{\mu}}=0$ When the search space associated with the CORESET p is the USS, $Y_{p,n_{s,f}^{\mu}}=(A_p \cdot Y_{p,n_{s,f}^{\mu}-1}) \bmod D$.

It should be noted that $Y_{p,-1}=n_{RNTI} \neq 0$, where an RNTI value of $n_{RNTI}$ is a C-RNTI. When p mod 3=0, $A_p$=39827f. When p mod 3=1, $A_p$=3982. When p mod 3=2, $A_p$=3983. D=65537.

i=0, . . . , L−1.

$N_{CCE,p}$ is a quantity of CCEs occupied by the search space associated with the CORESET p, and the CCEs are numbered from 0 to $N_{CCE,p}-1$.

$M_{s,n_{CI}}=0$ . . . , $M_{s,n_{CI}}^{(L)}-1$, where for the primary cell corresponding to the carrier indicator field value $n_{CI}$, $M_{s,n_{CI}}^{(L)}$ is a quantity of PDCCH candidates, and is configured for the UE to monitor a search space set s at an aggregation level L.

For any CSS, $M_{s,max}^{(L)} = M_{s,0}^{(L)}$.

For the USS, $N_{s,max}^{(L)}$ is a maximum value of all search space set s whose CCE aggregation level is L and for which $n_{CI}$ is configured.

(5) Scrambling

In existing single-hop transmission, a transmit end may multiply a pseudo random binary sequence by to-be-sent data to scramble the data, to encrypt the data to prevent the data from being tampered with in a transmission process. The used pseudo random binary sequence may be referred to as a scrambling code sequence.

Downlink transmission on a uu link is used as an example. A base station may scramble, by using the scrambling code sequence, data mapped to a physical downlink shared channel (PDSCH). The scrambling code sequence is a bit sequence with a length of 31 bits, and is specifically obtained by performing a modulo-2 operation after a sequence X1 and a sequence X2 are added. The sequence X1 is determined according to a protocol (3GPP TS 38.211). Generally, the sequence X1 is unchanged, and an initial value of the sequence X2 may be determined according to $C_{init} = n_{RNTI} \cdot 2^{15} + q \cdot 2^{14} + n_{ID}$.

$n_{RNTI}$ is an RNTI associated with PDSCH transmission, namely, an RNTI of a terminal that receives the PDSCH.

A value of 9 is 0 or 1. When 9=0, the base station uses single-codeword transmission, that is, data sent by the base station includes one transport block (transport block, TB) for transmission. When 9=1, the base station uses dual-codeword transmission, that is, data sent by the base station includes two transport blocks (transport block, TB) for transmission.

$n_{ID}$ is a parameter dataScramblingIdentityPDSCH configured by a higher layer or $N_{ID}^{cell}$. A value of the parameter configured by the higher layer is $\{0, 1, \ldots, 1023\}$. When the parameter is configured, the following conditions need to be satisfied: The RNTI is equal to a C-RNTI, an MCS-C-RNTI (modulation coding scheme cell RNTI), or a CS-RNTI (configured scheduling RNTI), and a network device does not use DCI format 1_0 to schedule downlink data of a terminal device in common search space. In another condition, $n_{ID} = N_{ID}^{cell}$, and $N_{ID}^{cell}$ is a physical layer cell ID, namely, an ID of a cell of the base station sending the PDSCH.

Figure 3:
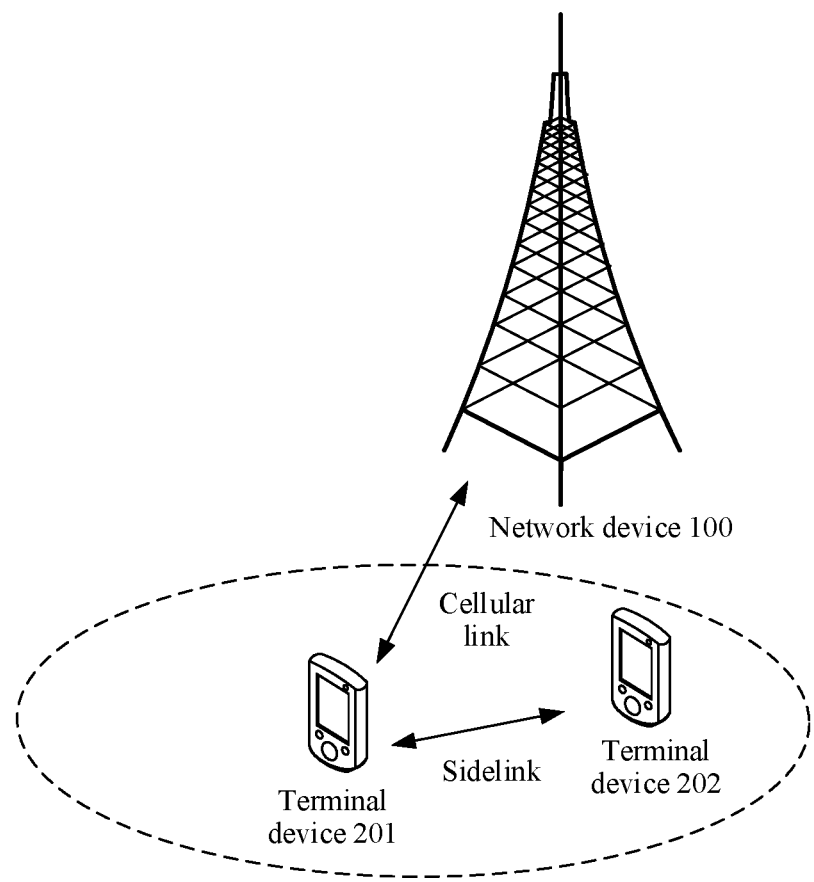
FIG. 3 is a schematic diagram of a communication system according to an embodiment of this application.

FIG. 3 is a schematic diagram of a communication system to which the technical solutions provided in this application are applicable. The communication system may include a plurality of network devices (where only a network device 100 is shown) and a plurality of terminal devices (where only a terminal device 201 and a terminal device 202 are shown in the figure). FIG. 3 is only a schematic diagram, and does not constitute a limitation on an applicable scenario of the technical solutions provided in this application.

The network device and the terminal device may perform uplink and downlink transmission through a cellular link (e.g., a Uu link), and the terminal devices may communicate with each other through a sidelink, where the communication is, for example, D2D communication, V2X communication, and machine type communication (MTC).

The network device 100 and the terminal devices may further perform cooperation transmission. For example, a user cooperation group may include the terminal device 201 and the terminal device 202. In downlink transmission, the terminal device 201 serves as a CUE, and the terminal device 202 serves as a TUE. The network device sends data to the terminal device 201, and the terminal device 201 receives the data from the network device and then sends the data to the terminal device 202. In uplink transmission, the terminal device 201 serves as a CUE, and the terminal device 202 serves as an SUE. The terminal device 202 sends data to the terminal device 201, and the terminal device 201 receives the data from the terminal device 202 and then sends the data to the network device.

The network device 100 may be any device with a wireless transceiver function. The network device 100 includes but is not limited to: an evolved NodeB (eNB or e-NodeB) in LTE, a gNodeB (gNB) or a transmission reception point (TRP) in NR, a base station that subsequently evolves in 3GPP, an access node in a WiFi system, a wireless relay node, a wireless backhaul node, or the like. The base station may be a macro base station, a micro base station, a picocell base station, a small cell, a relay station, a balloon station, or the like. A plurality of base stations may support the foregoing networks using a same technology, or may support the foregoing networks using different technologies. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. That the network device is a base station is used as an example for description below. The plurality of network devices may be base stations of a same type, or may be base stations of different types. The base station may communicate with a terminal device, or may communicate with the terminal device through a relay station. The terminal device may communicate with a plurality of base stations using different technologies. For example, the terminal device may communicate with a base station supporting an LTE network, may communicate with a base station supporting a 5G network, or may support dual connections to the base station in the LTE network and the base station in the 5G network.

The terminal device (for example, the terminal device 201 or the terminal device 202) is a device having a wireless transceiver function, and may be deployed on land, where the deployment includes indoor, outdoor, handheld, wearable, or vehicle-mounted deployment; may be deployed on water (for example, on a ship); or may be deployed in air (for example, on an aircraft, a balloon, or a satellite). The terminal may be a mobile phone, a tablet computer (e.g., iPad), a computer with a wireless transceiver function, a virtual reality (VR) terminal device, an augmented reality (AR) terminal device, a wireless terminal in industrial control, a vehicle-mounted terminal device, a wireless terminal in self driving, a wireless terminal in telemedicine, a wireless terminal in a smart grid, a wireless terminal in transportation safety, a wireless terminal in a smart city, a wireless terminal in a smart home, a wearable terminal device, or the like. An application scenario is not limited in embodiments of this application. The terminal may also be sometimes referred to as a terminal device, a user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or mobile. The terminal device in this application may alternatively be an in-vehicle module, an in-vehicle module, an onboard component, an automotive chip, or an on board unit that is built in a vehicle as one or more components or units. The vehicle may implement the method in this application by using the in-vehicle module, the in-vehicle module, the onboard component, the automotive chip, or the on board unit that is built in the vehicle.

In the downlink cooperation transmission shown in FIG. 1 or FIG. 2, a network device may scramble downlink control information by using an identifier of a cooperation group, and a terminal device may perform blind detection in all UE-specific search space of the terminal device and all common search space based on the identifier of the cooperation group, to obtain the DCI sent by the base station. Consequently, complexity of blind detection performed by the terminal device is high.

Embodiments of this application provide a communication method. A first terminal device (for example, a CUE) receives a first message from a network device. The first message includes first information and second information, the first information is used to indicate first search space, the second information is used to indicate a first cooperation group identifier, and a first cooperation group includes the first terminal device and a second terminal device (for example, a CUE). The first terminal device may further obtain first control information from the first search space based on the first information and the second information. The first control information is used to schedule downlink data of the second terminal device. The CUE may obtain, based on the search space indicated by the first information, the control information used by the network device to send the downlink data of the second terminal device, to receive the downlink data of the second terminal device from the network device, and assist the network device in sending the downlink data to the second terminal device. It can be learned that, in the method provided in embodiments of this application, a terminal device may obtain, by using a message, a cooperation group identifier and search space (for example, the first search space in embodiments of this application) that are configured by the network device, and then perform, based on the cooperation group identifier, blind detection in the search space configured by using the message, to obtain downlink control information sent by the network device. The terminal device does not need to perform blind detection in all UE-specific search space of the terminal device and all common search space, and only needs to perform, based on the cooperation group identifier, blind detection in the first search space indicated by the network device, to obtain the downlink control information sent by the network device. Compared with a method in a conventional technology, the method provided in embodiments of this application greatly reduces complexity of blind detection performed by the terminal device.

Figure 4A:
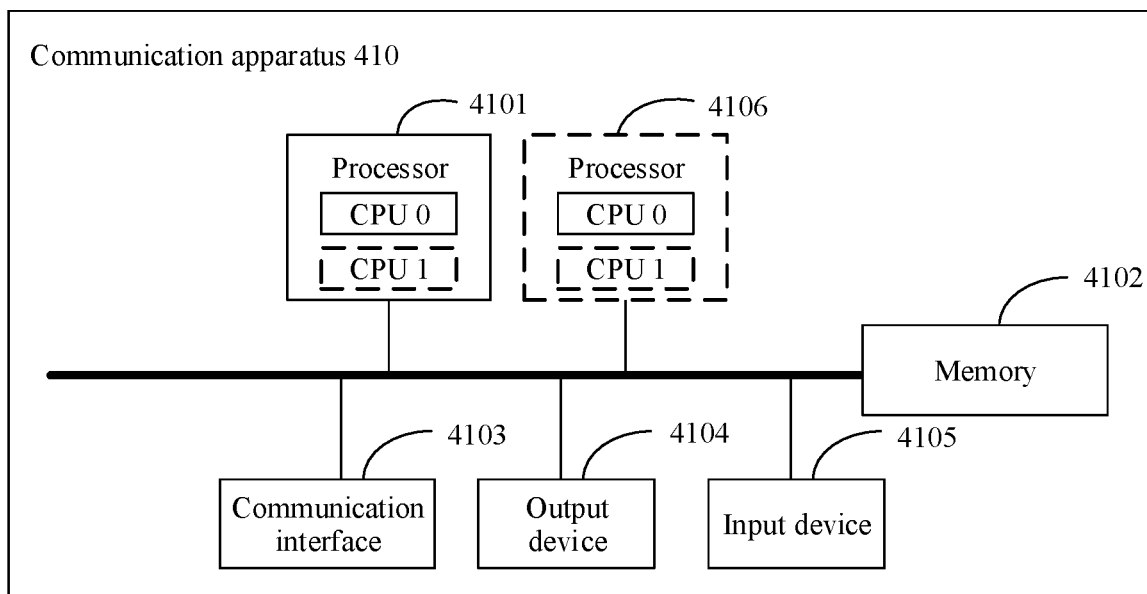
FIG. 4A is a block diagram of a structure of a communication apparatus according to an embodiment of this application.

The terminal device in embodiments of this application may be implemented by using a communication apparatus 410 in FIG. 4A. FIG. 4A is a schematic diagram of a hardware structure of a communication apparatus 410 according to an embodiment of this application. The communication apparatus 410 includes a processor 4101, a memory 4102, and at least one communication interface (where in FIG. 4A, an example in which a communication interface 4103 is included is merely used for description). The processor 4101, the memory 4102, and the communication interface 4103 are connected to each other.

The processor 4101 may be a general purpose central processing unit (CPU), a microprocessor, an application-specific integrated circuit (ASIC), or one or more integrated circuits configured to control program execution of the solutions in this application.

The communication interface 4103 may be any apparatus such as a transceiver, and is configured to communicate with another device or a communication network, for example, the Ethernet, a radio access network (RAN), or a wireless local area network (WLAN).

The memory 4102 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through a communication line 4102. Alternatively, the memory may be integrated with the processor.

The memory 4102 is configured to store computer-executable instructions for executing the solutions in this application, and the execution is controlled by the processor 4101. The processor 4101 is configured to execute the computer-executable instructions stored in the memory 4102, to implement the methods provided in the following embodiments of this application.

Optionally, the computer-executable instructions in this embodiment of this application may also be referred to as application program code. This is not specifically limited in this embodiment of this application.

During specific implementation, in an embodiment, the processor 4101 may include one or more CPUs, for example, a CPU 0 and a CPU 1 in FIG. 4A.

During specific implementation, in an embodiment, the communication apparatus 410 may include a plurality of processors such as the processor 4101 and a processor 4106 in FIG. 4A. Each of the processors may be a single-core processor, or may be a multi-core processor. The processor herein may be one or more devices, circuits, and/or processing cores configured to process data (for example, computer program instructions).

During specific implementation, in an embodiment, the communication apparatus 410 may further include an output device 4104 and an input device 4105. The output device 4104 communicates with the processor 4101, and may display information in a plurality of manners. For example, the output device 4104 may be a liquid crystal display (LCD), a light emitting diode (LED) display device, a cathode ray tube (CRT) display device, or a projector. The input device 4105 communicates with the processor 4101, and may receive an input from a user in a plurality of manners. For example, the input device 4105 may be a mouse, a keyboard, a touchscreen device, or a sensor device.

The communication apparatus 410 may be a general-purpose device or a special-purpose device. During specific implementation, the communication apparatus 410 may be a desktop computer, a portable computer, a network server, a personal digital assistant (PDA), a mobile phone, a tablet computer, a wireless terminal apparatus, an embedded device, or a device having a structure similar to that in FIG. 4A. A type of the communication apparatus 410 is not limited in this embodiment of this application.

It should be noted that the communication apparatus 410 may be an entire terminal, may be a part or component that implements a function of the terminal, or may be a communication chip, for example, a baseband chip. When the communication apparatus 410 is an entire terminal, the communication interface may be a radio frequency module. When the communication apparatus 410 is a communication chip, the communication interface 4103 may be an input/output interface circuit of the chip, where the input/output interface circuit is configured to read and output a baseband signal.

Figure 4B:
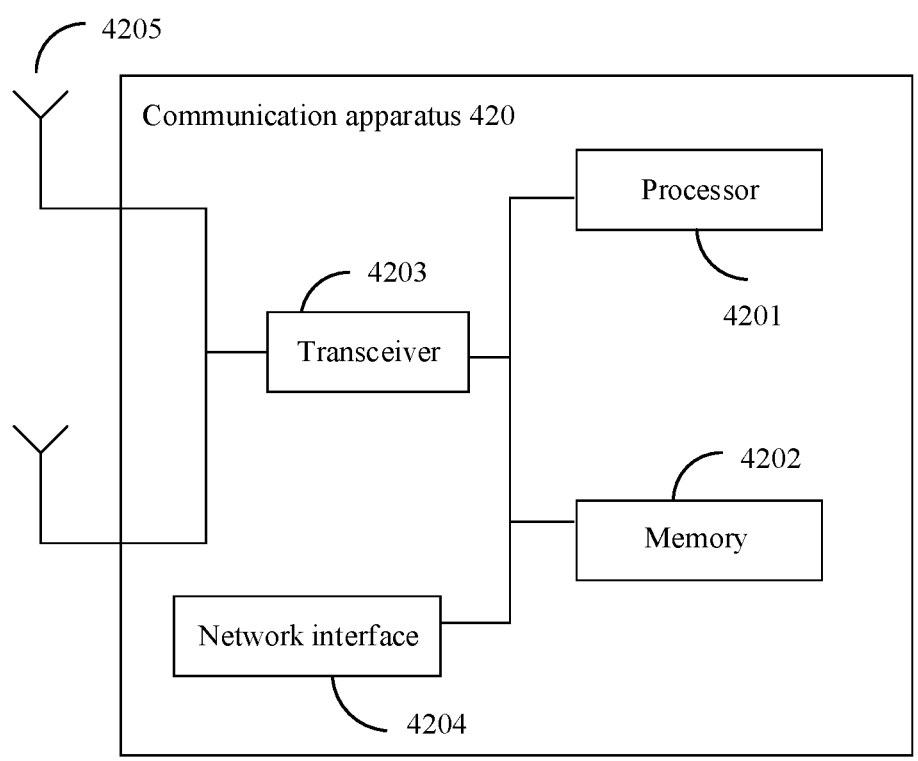
FIG. 4B is another block diagram of a structure of a communication apparatus according to an embodiment of this application.

FIG. 4B is a schematic diagram of a structure of a communication apparatus. For a structure of the communication apparatus 420, refer to the structure shown in FIG. 4B.

The communication apparatus includes at least one processor 4201, at least one memory 4202, at least one transceiver 4203, at least one network interface 4204, and one or more antennas 4205. The processor 4201, the memory 4202, the transceiver 4203, and the network interface 4204 are connected. The antenna 4205 is connected to the transceiver 4203. The network interface 4204 is configured to enable the communication apparatus to connect to another communication device through a communication link. For example, the communication apparatus is connected to a core network element through an SI interface. In embodiments of this application, the connection may include various types of interfaces, transmission lines, buses, or the like. This is not limited in this embodiment.

A processor, for example, the processor 4201, in this embodiment of this application may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 4201 may be a single-core processor or a multi-core processor. The at least one processor 4201 may be integrated into one chip or located on a plurality of different chips.

A memory, for example, the memory 4202, in this embodiment of this application may include at least one of the following types: a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The memory 4202 may exist independently, and is connected to the processor 4201. Optionally, the memory 4202 may alternatively be integrated with the processor 4201, for example, integrated into one chip. The memory 4202 can store program code for executing the technical solutions in embodiments of this application, and the processor 4201 controls the execution. Various types of executed computer program code may also be considered as drivers of the processor 4201. For example, the processor 4201 is configured to execute the computer program code stored in the memory 4202, to implement the technical solutions in embodiments of this application.

The transceiver 4203 may be configured to support receiving or sending of a radio frequency signal between the communication apparatus and a terminal device, and the transceiver 4203 may be connected to the antenna 4205. Specifically, the one or more antennas 4205 may receive a radio frequency signal. The transceiver 4203 may be configured to: receive the radio frequency signal from the antenna, convert the radio frequency signal into a digital baseband signal or a digital intermediate frequency signal, and provide the digital baseband signal or the digital intermediate frequency signal for the processor 4201, so that the processor 4201 further processes the digital baseband signal or the digital intermediate frequency signal, for example, performs demodulation processing and decoding processing. In addition, the transceiver 4203 may be configured to: receive a modulated digital baseband signal or digital intermediate frequency signal from the processor 4201, convert the modulated digital baseband signal or digital intermediate frequency signal into a radio frequency signal, and send the radio frequency signal through the one or more antennas 4205. Specifically, the transceiver 4203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 4203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

It should be noted that the communication apparatus 420 may be an entire communication apparatus, may be a part or component that implements a function of the communication apparatus, or may be a communication chip. When the communication apparatus 420 is a communication chip, the transceiver 4203 may be an interface circuit of the chip, where the interface circuit is configured to read and output a baseband signal.

Figure 5:
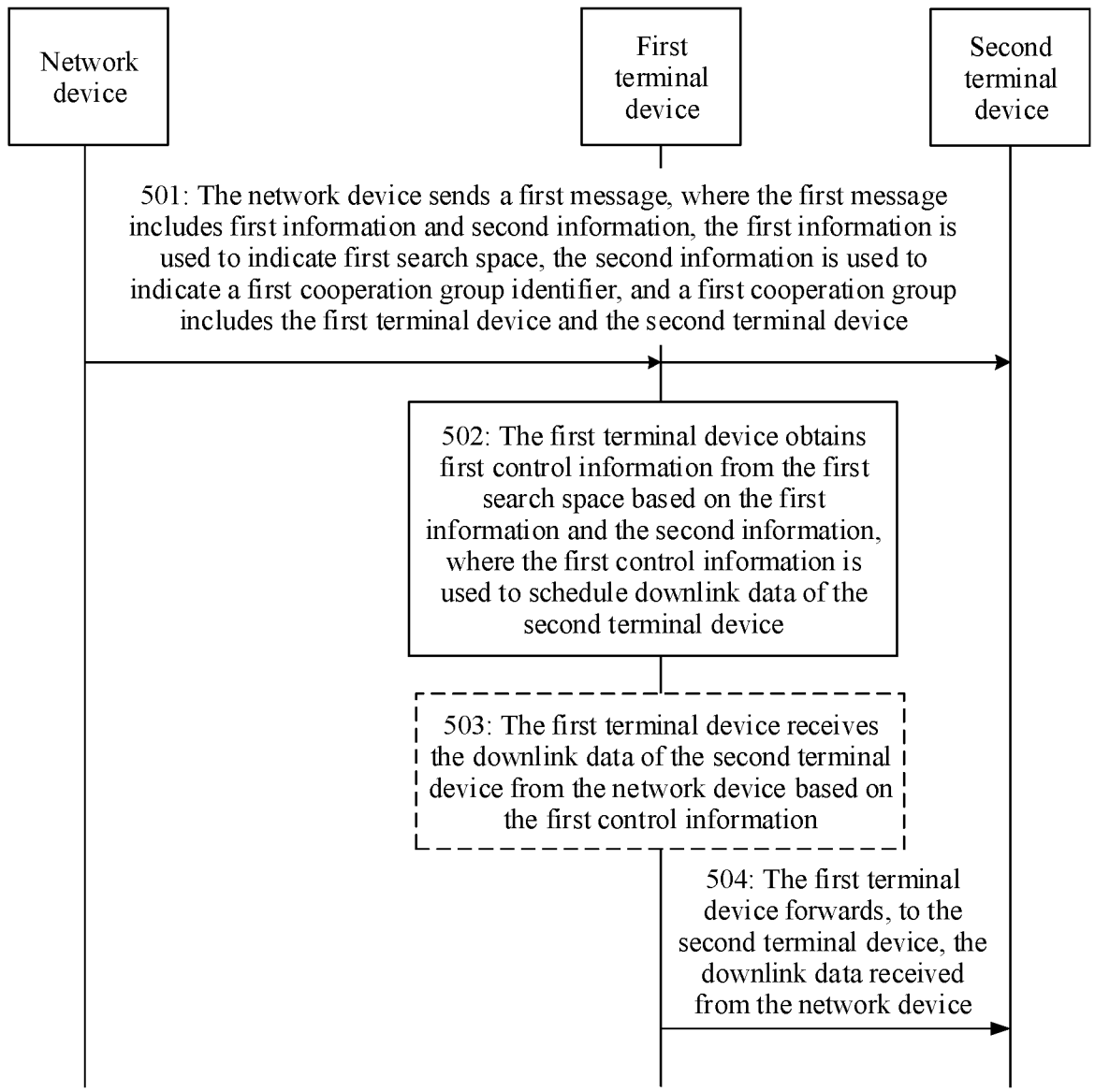
FIG. 5 is a schematic flowchart of a communication method according to an embodiment of this application.

An embodiment of this application provides a communication method. As shown in FIG. 5, the method includes the following steps.

Step 501: A network device sends a first message to a first terminal device and a second terminal device, where the first message includes first information and second information, the first information is used to indicate first search space, the second information is used to indicate a first cooperation group identifier, and a first cooperation group includes the first terminal device and the second terminal device.

During specific implementation, the second terminal device may be located at an edge of a cell covered by the network device, and the first terminal device in an area with strong coverage may assist the network device in sending data to the second terminal device. It may be understood that the first terminal device and the second terminal device may belong to a same user cooperation group, for example, the first cooperation group in this embodiment of this application. In addition, the first terminal device is a CUE, and is configured to assist the network device in transmitting the data to the second terminal device. The second terminal device is a TUE, and is a final receive end of the data sent by the network device. That is, the data sent by the network device terminates at the second terminal device.

When the network device needs to send downlink data to the TUE, the network device may first send the downlink data to the CUE. After receiving the downlink data from the network device, the CUE sends the downlink data to the TUE. In this embodiment of this application, the network device may further send, to the CUE by using search space, control information for scheduling the downlink data, so that the CUE can receive, on a resource indicated by the control information, the downlink data sent by the network device, to assist the network device in sending the downlink data to the TUE.

In addition, the network device further needs to send information about the search space to the CUE, so that the CUE can perform blind detection in the search space, to receive a PDCCH in the search space, and obtain the control information from the PDCCH.

For example, the network device sends the first message to the CUE (for example, the first terminal device), where the first message includes information about the first search space, for example, the first information in this embodiment of this application.

In a possible implementation, the first information may include one or more of an identifier of the first search space (SearchSpace ID), a control resource set ID (controlResourceSetId) of a control resource set corresponding to the first search space, a control information format (DCI format) corresponding to the first search space, and an aggregation level L corresponding to the first search space. It should be noted that, an index p of the control resource set may be determined based on the control resource set ID. The control information format corresponding to the first search space is a format of DCI carried on a PDCCH transmitted in the first search space. In this embodiment of this application, the DCI format in the first information may be a DCI format specific to cooperation transmission. It may be understood that DCI in such a format is DCI sent by the network device to a terminal device in a cooperation group in a cooperation transmission scenario. The control resource set corresponding to the first search space is a control resource set to which the first search space belongs. The aggregation level L corresponding to the first search space is an aggregation level of the PDCCH transmitted in the first search space.

In a possible implementation, the first message is a radio resource control (RRC) message.

It should be noted that the first message may further indicate the cooperation group, for example, the first cooperation group in this embodiment of this application, to which the first terminal device and the second terminal device belong. In this embodiment of this application, the second information in the first message is used to indicate the first cooperation group identifier, and the first cooperation group identifier is an identifier of the first cooperation group.

Specifically, the first cooperation group identifier may be a radio network temporary identifier RNTI. An RNTI of the second terminal device may be reused for the first cooperation group identifier. That is, the first cooperation group identifier is the same as the RNTI of the second terminal device.

In a possible implementation, the first cooperation group identifier is different from an RNTI of the first terminal device, and is different from an RNTI of the second terminal device.

In this embodiment of this application, common search space is associated with a cooperation group identifier. A terminal device only needs to perform blind detection in search space associated with a cooperation group, to obtain group-level control information, for example, DCI of the cooperation group, sent by the network device. In a conventional technology, the terminal device performs blind detection in all UE-specific search space of the terminal device and all common search space. In comparison, the method provided in this embodiment of this application greatly reduces complexity of blind detection performed by the terminal device.

It should be noted that the group-level control information is control information received by each terminal device in the cooperation group. For example, both a CUE and a TUE in the cooperation group receive the group-level control information sent by the network device.

In a possible implementation, the common search space and the cooperation group identifier are configured by using one IE (information element) of the RRC message. For example, the second information and the first information are in a same IE of the first message.

In this embodiment of this application, the network device may further configure search space specific to the cooperation group. The group-level control information is transmitted by using the search space specific to the cooperation group. For example, the network device transmits the PDCCH by using the search space specific to the cooperation group, and the control information carried on the PDCCH is used to schedule the downlink data of the TUE.

In a possible implementation, search space specific to the cooperation group and the cooperation group identifier are configured by using one IE of the RRC message. Alternatively, search space specific to the cooperation group and the cooperation group identifier are configured by using different IEs of the RRC message. It may be understood that the second information and the first information may be in a same IE of the first message, or may be in different IEs of the first message. This is not limited in this embodiment of this application.

It should be noted that the first search space in this embodiment of this application may be search space specific to the first cooperation group. The first terminal device may perform blind detection in the search space specific to the first cooperation group, to attempt to obtain the control information for scheduling the downlink data of the second terminal device.

Step 502: The first terminal device obtains first control information from the first search space based on the first information and the second information, where the first control information is used to schedule the downlink data of the second terminal device.

During specific implementation, the first terminal device may receive the first control information in the first search space indicated by the first information. The first control information is scrambled by using the first cooperation group identifier. Further, the first terminal device may further determine the first cooperation group identifier based on the second information, and descramble the first control information based on the first cooperation group identifier.

It should be noted that the first terminal device may determine, based on the first information, CCEs occupied by the first search space, and perform blind detection on the CCEs, to attempt to receive the first control information sent by the network device.

During specific implementation, the first terminal device may determine, based on "the control resource set ID" and "the aggregation level L" in the first information, the CCEs occupied by the first search space. For example, "the index p of the control resource set" is determined based on "the control resource set ID", and "the index p of the control resource set" and "the aggregation level L" are substituted into the foregoing formula (1) to determine the CCEs occupied by the first search space.

The first terminal device may further perform, based on the DCI format in the first information, blind detection on the CCEs occupied by the first search space, to obtain the first control information. For example, if a format of control information received by the first terminal device on the CCEs occupied by the first search space is a format indicated by the DCI format in the first information, the first terminal device determines that the control information is sent by the network device to the first terminal device. Otherwise, the first terminal device may discard the received control information, and continue to perform blind detection.

The first terminal device may further descramble the first control information based on the cooperation group identifier (for example, the first cooperation group identifier in this embodiment of this application) indicated by the second information, and determine a time-frequency resource indicated by the first control information, to receive, on the time-frequency resource indicated by the first control information, the downlink data that is of the second terminal device and that is sent by the network device, thereby assisting the network device in sending the downlink data to the second terminal device.

Optionally, the method shown in FIG. 5 further includes the following steps.

Step 503: The first terminal device receives the downlink data of the second terminal device from the network device based on the first control information.

Step 504: The first terminal device forwards, to the second terminal device, the downlink data received from the network device.

Specifically, the first terminal device may further forward, to the second terminal device through a communication link between the first terminal device and the second terminal device, the downlink data received based on the first control information. The communication link between the first terminal device and the second terminal device may be a V2X link, a D2D link, an unlicensed spectrum link, or a Wi-Fi link.

In addition, a forwarding manner used by the first terminal device may be amplify-and-forward (AF), decode-and-forward (DF), or the like.

AF means that the first terminal device performs power amplification on an analog signal that carries the downlink data, and then forwards the analog signal. DF means that the first terminal device obtains a data packet on the time-frequency resource indicated by the first control information, descrambles the data packet based on the first cooperation group identifier to obtain a transport block (TB), and then forwards the obtained TB to the second terminal device.

Optionally, in the cooperation transmission scenario, the network device may further indicate, by using the RRC message, that the DCI format is control information specific to the cooperation transmission, so that the terminal device can perform blind detection in the search space based on the DCI format indicated by the network device. For example, when the terminal device obtains, through detection in search space indicated by the RRC message, the control information in the format specific to the cooperation transmission, the terminal device stops blind detection.

For example, the first message may further include third information, and the third information is used to indicate the control information format specific to the cooperation transmission. The network device may determine, based on the third information, the control information format specific to the cooperation transmission. When control information (for example, the first control information in this embodiment of this application) in the format is obtained through detection in the first search space, blind detection in the first search space is stopped.

In a possible implementation, when the network device transmits control information by using the search space specific to the cooperation group, the network device may configure, by using the RRC message, an offset of the search space specific to the cooperation group relative to the common search space.

For example, the first information in the first message includes a first offset and information about the common search space, and the first offset is an offset between the first search space and the common search space. The first terminal device may determine the search space, for example, the first search space in this embodiment of this application, specific to the first cooperation group based on the first offset and the information about the common search space.

During specific implementation, a field may be added to searchSpaceType of the RRC message, to define the search space specific to the cooperation group. The field is parallel to a common field and a ue-Specific field. The field may include dci-Format-for-UC. A field may be further added to searchSpaceType to indicate the offset of the search space specific to the cooperation group relative to the common search space. The field is parallel to another field in searchSpaceType. Alternatively, a field is added to SearchSpace to indicate the offset of the search space specific to the cooperation group relative to the common search space. The field is parallel to another field in SearchSpace. Specific implementation of the first information in the standard may be as follows:

```
ue-cooperation                                          SEQUENCE {
offsetToCSS (the offset relative to the common search space)
INTEGER,
dci-Format-for-UC (the DCI format
specific to the cooperation transmission)
ENUMERATED {...},
``` where ue-cooperation is used to define the search space specific to the cooperation group, offsetToCSS is used to indicate the offset between the search space specific to the cooperation group and the common search space, and dci-Format-for-UC is used to indicate the control information format specific to cooperation.

During specific implementation, the second information may be added to the common field in the searchSpaceType field of the RRC message. For example, specific implementation of the second information in the standard may be as follows:

```
searchSpaceType                              CHOICE {
  common                                       SEQUENCE {
    UC-RNTI (a cooperation group identifier)     UC-RNTI-
Value (a UC-RNTI value)
    dci-Format0-0-AndFormat1-0                 SEQUENCE {
    ...
  }
```

During specific implementation, the third information may be added to the common field in the searchSpaceType field of the RRC message. The third information may be parallel to an existing dci-Format in the common field. For example, specific implementation of the control information format, namely, the field "dci-Format-for-UC", specific to cooperation in the standard may be as follows:

```
  OPTIONAL -- Need R
    dci-Format-for-UC                        SEQUENCE {...}
  }
```

Figure 6:
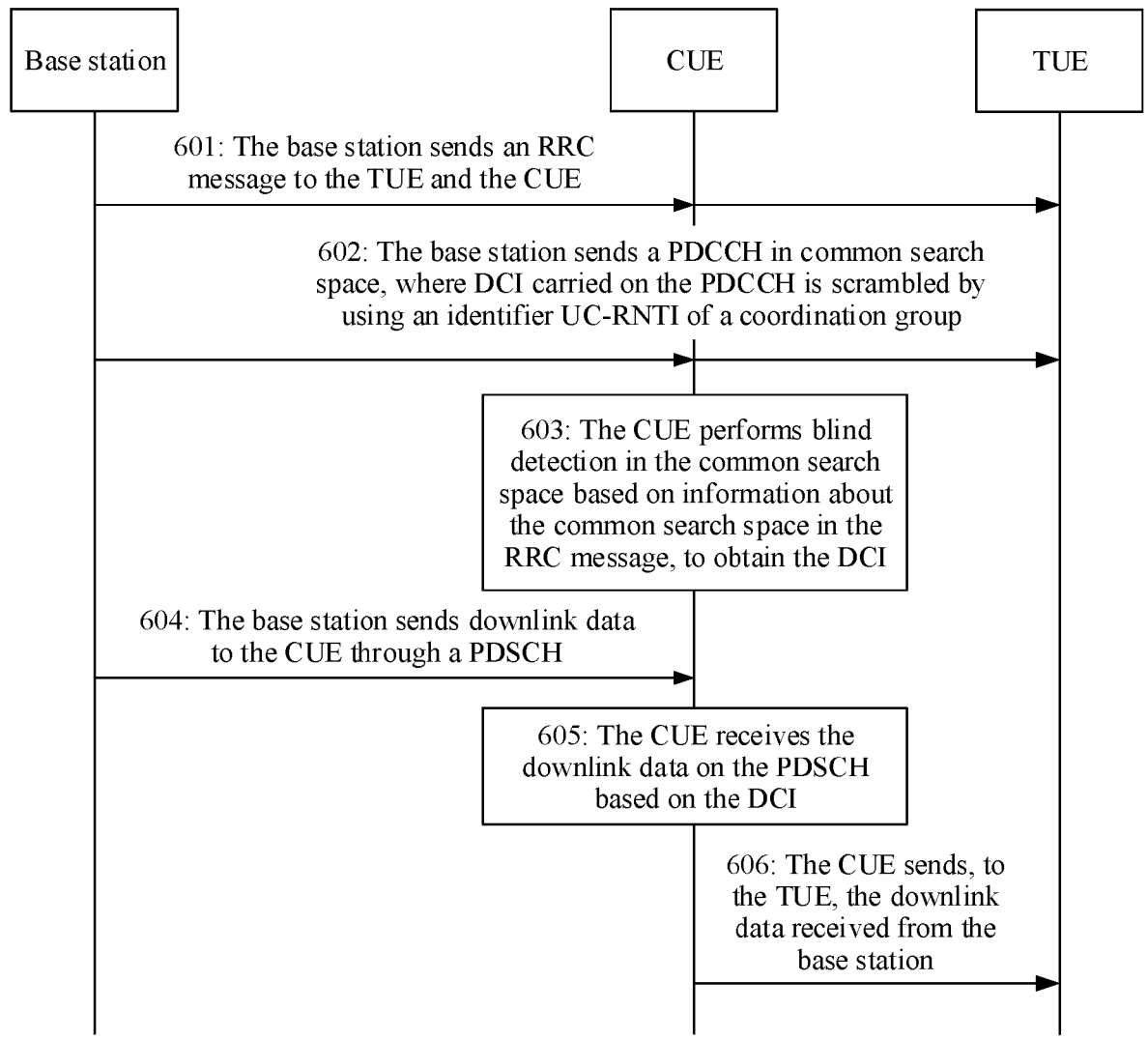
FIG. 6 is another schematic flowchart of a communication method according to an embodiment of this application.

An embodiment of this application provides a communication method. A network device may transmit, by using common search space, control information specific to cooperation transmission. As shown in FIG. 6, the method includes the following steps.

601: A base station sends an RRC message to a TUE and a CUE.

The TUE and the CUE are terminal devices in a same cooperation group. The CUE may assist the base station in sending data to the TUE. One IE of the RRC message includes an identifier UC-RNTI of the cooperation group to which the TUE and the CUE belongs and information about the common search space. The information about the common search space may be a SearchSpace ID of the common search space, a format of DCI carried on a PDCCH transmitted in the common search space, an aggregation level of the PDCCH transmitted in the common search space, a control resource set ID corresponding to the common search space, and the like. The RRC message may be considered as the first message in embodiments of this application.

602: The base station sends the PDCCH in the common search space, where the DCI carried on the PDCCH is scrambled by using the identifier UC-RNTI of the cooperation group.

603: The CUE performs blind detection in the common search space based on the information about the common search space in the RRC message, to obtain the DCI.

Specifically, the CUE may determine an index p of a control resource set based on a control resource set IE corresponding to the common search space. The CUE may determine, based on an aggregation level and the index p of the control resource set that are indicated by an IE, a CCE occupied by the common search space, and may further descramble, based on the identifier UC-RNTI of the cooperation group, the DCI obtained in the common search space.

604: The base station sends downlink data to the CUE through a physical downlink shared channel (PDSCH).

605: The CUE receives the downlink data on the PDSCH based on the DCI.

Specifically, the CUE receives, on a time-frequency resource indicated by the DCI, the downlink data sent by the base station. The downlink data is downlink data of the TUE.

606: The CUE sends, to the TUE, the downlink data received from the base station.

Figure 7:
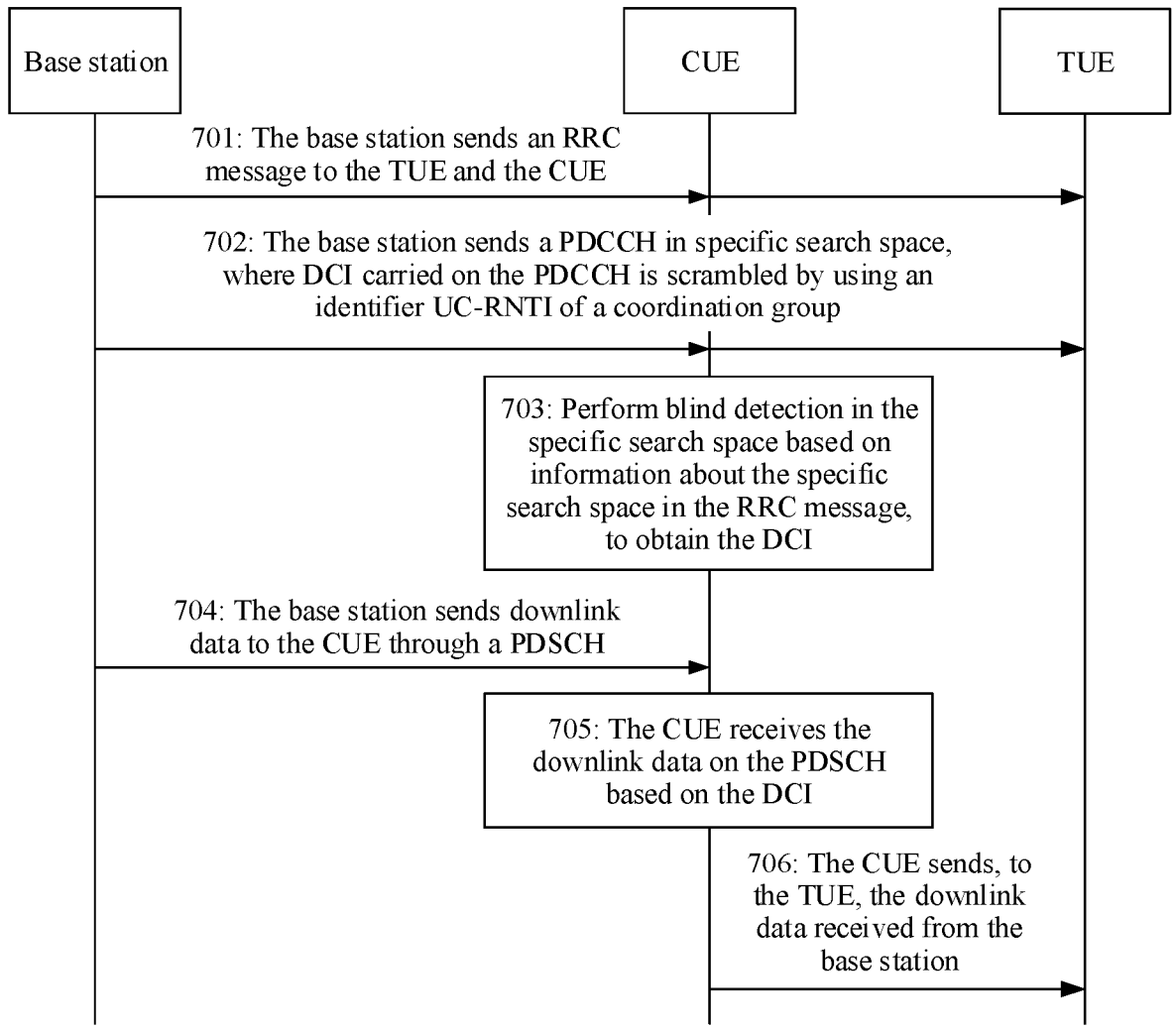
FIG. 7 is another schematic flowchart of a communication method according to an embodiment of this application.

An embodiment of this application provides a communication method. A network device may transmit, by using search space specific to a cooperation group (where the search space is briefly referred to as "specific search space" below), control information specific to cooperation transmission. As shown in FIG. 7, the method includes the following steps.

701: A base station sends an RRC message to a TUE and a CUE.

The TUE and the CUE are terminal devices in a same cooperation group. The CUE may assist the base station in sending data to the TUE. One IE of the RRC message includes an identifier UC-RNTI of the cooperation group to which the TUE and the CUE belong and information about specific search space, or the identifier UC-RNTI of the cooperation group and the information about the specific search space are in different IEs of the RRC message. The RRC message may be considered as the first message in embodiments of this application.

The information about the specific search space may be an offset of the specific search space relative to common search space, a format of DCI carried on a PDCCH transmitted in the specific search space, an aggregation level of the PDCCH transmitted in the specific search space, a control resource set ID corresponding to the specific search space, and the like.

702: The base station sends the PDCCH in the specific search space, where the DCI carried on the PDCCH is scrambled by using the identifier UC-RNTI of the cooperation group.

703: The CUE performs blind detection in the specific search space based on the information about the specific search space in the RRC message, to obtain the DCI.

Specifically, the CUE may determine, based on an aggregation level, the control resource set ID, and the offset of the specific search space relative to the common search space that are indicated by the IE, a CCE occupied by the specific search space, or may descramble, based on the identifier UC-RNTI of the cooperation group, the DCI obtained in the specific search space.

704: The base station sends downlink data of the TUE to the CUE through a PDSCH.

705: The CUE receives the downlink data on the PDSCH based on the DCI.

Specifically, the CUE receives, on a time-frequency resource indicated by the DCI, the downlink data sent by the base station. The downlink data is the downlink data of the TUE.

706: The CUE sends, to the TUE, the downlink data received from the base station.

In a possible implementation, a protocol defines the offset $\Delta_{UC}$ between the search space specific to the cooperation group and the common search space. Based on the foregoing formula (1), the search space specific to the cooperation group satisfies the following formula (2):

$$L \cdot \left\{ \left( \Delta_{UC} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i \quad \text{formula (2)}$$

$\Delta_{UC}$ a non-zero integer.

In a possible implementation, a parameter $n_{UC}$ is added to the foregoing formula (1). A protocol defines a value or a value range of the parameter, or the parameter is determined based on the identifier UC-RNTI of the cooperation group. For example, the parameter is a function of the identifier UC-RNTI of the cooperation group. The search space specific to the cooperation group satisfies the following formula (3):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} + n_{UC} \right) \bmod \lfloor N_{CCE,p}/L \rfloor \right\} + i \quad \text{formula (3)}$$

For the search space specific to the cooperation group, $n_{UC}=\Delta_{UC}$, where $\Delta_{UC}$ is a non-zero integer. When search space is the common search space, $n_{UC}=0$.

In a possible implementation, one item $n_{UC}$ is added to the formula. The parameter $n_{UC}$ is configured by using the RRC message. The search space specific to the cooperation group satisfies the following formula (4):

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} + n_{UC} \right) \bmod \lfloor N_{CCE,p}/L \rfloor \right\} + i \quad \text{formula (4)}$$

For the search space specific to the cooperation group, $n_{UC}=\Delta_{UC}$, where $\Delta_{UC}$ is a non-zero integer. When search space is the common search space, $n_{UC}=0$.

It should be noted that, for meanings of other parameters in the formula (2), (3), or (4), refer to the foregoing related descriptions of the formula (1) in this embodiment of this application. Details are not described herein again. During specific implementation, the CUE may determine an index p of a control resource set based on the control resource set ID corresponding to the specific search space, and may further substitute the offset $\Delta_{UC}$ between the specific search space and the common search space, the index p of the control resource set corresponding to the specific search space, and the aggregation level L of the PDCCH transmitted in the specific search into the foregoing formula (2), (3), or (4) to determine the CCE occupied by the specific search space, thereby performing blind detection on the CCE occupied by the specific search space, to obtain the DCI for scheduling the downlink data of the TUE.

Figure 8:
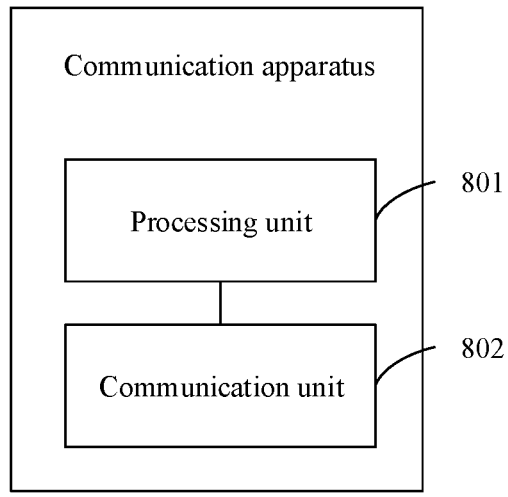
FIG. 8 to FIG. 11 each are another block diagram of a structure of a communication apparatus according to an embodiment of this application.

When each function module is obtained through division based on each corresponding function, FIG. 8 is a possible schematic diagram of a structure of the communication apparatus in the foregoing embodiments. The communication apparatus shown in FIG. 8 may be the first terminal device in embodiments of this application, may be a component that implements the foregoing methods in the terminal device, or may be a chip used in the terminal device. The chip may be a system-on-a-chip (System-On-a-Chip, SOC), a baseband chip having a communication function, or the like. As shown in FIG. 8, the communication apparatus includes a processing unit 801 and a communication unit 802. The processing unit may be one or more processors, and the communication unit may be a transceiver.

The processing unit 801 is configured to support the first terminal device in performing step 503, and/or is configured to perform another process of the technology described in this specification.

The communication unit 802 is configured to support communication between the first terminal device and another communication apparatus, for example, support the terminal device in performing step 504, and/or is configured to perform another process of the technology described in this specification.

It should be noted that all related content of the steps in the foregoing method embodiments may be cited in function descriptions of corresponding function modules. Details are not described herein again.

Figure 9:
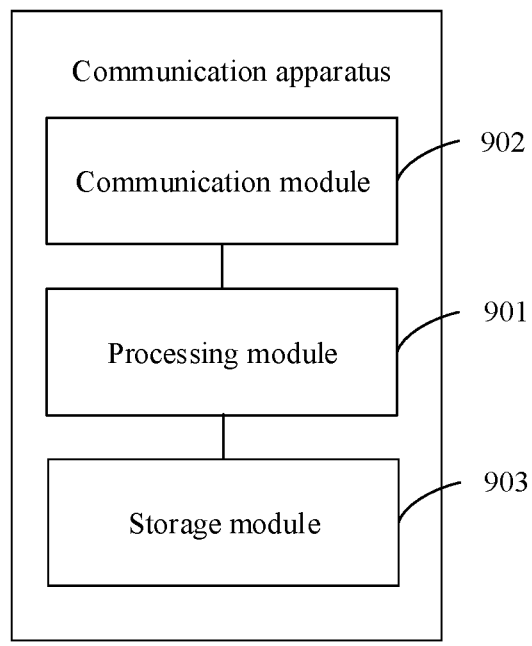

For example, when an integrated unit is used, FIG. 9 is a schematic diagram of a structure of a communication apparatus according to an embodiment of this application. In FIG. 9, the communication apparatus includes a processing module 901 and a communication module 902. The processing module 901 is configured to control and manage actions of the communication apparatus, for example, perform the step performed by the processing unit 801, and/or is configured to perform another process of the technology described in this specification. The communication module 902 is configured to perform the step performed by the communication unit 802, and support interaction between the communication apparatus and another device, for example, interaction with another terminal device apparatus. As shown in FIG. 9, the communication apparatus may further include a storage module 903. The storage module 903 is configured to store program code and data of the communication apparatus.

When the processing module 901 is a processor, the communication module 902 is a transceiver, and the storage module 903 is a memory, the communication apparatus is the communication apparatus shown in FIG. 4A.

Figure 10:
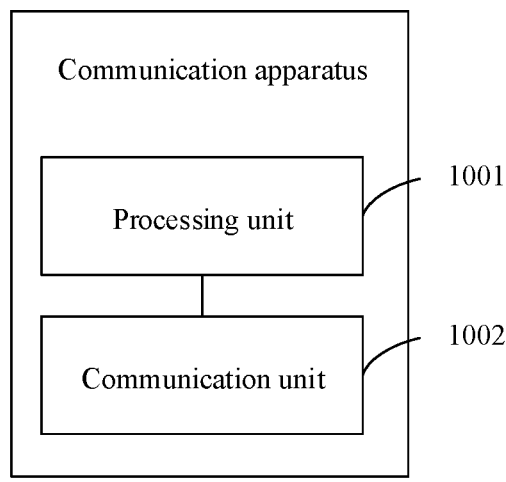

When each function module is obtained through division based on each corresponding function, FIG. 10 is a possible schematic diagram of a structure of the communication apparatus in the foregoing embodiments. The communication apparatus shown in FIG. 10 may be the network device in embodiments of this application, may be a component that implements the foregoing methods in the network device, or may be a chip used in the network device. The chip may be a system-on-a-chip (System-On-a-Chip, SOC), a baseband chip having a communication function, or the like. As shown in FIG. 10, the communication apparatus includes a processing unit 1001 and a communication unit 1002. The processing unit 1001 may be one or more processors, and the communication unit 1002 may be a transceiver.

The processing unit 1001 is configured to support the network device in performing internal processing, for example, support the network device in determining first information and second information, and/or is configured to perform another process of the technology described in this specification.

The communication unit 1002 is configured to support communication between the network device and another communication apparatus, for example, support the network device in performing step 501, and/or is configured to perform another process of the technology described in this specification.

It should be noted that all related content of the steps in the foregoing method embodiments may be cited in function descriptions of corresponding function modules. Details are not described herein again.

Figure 11:
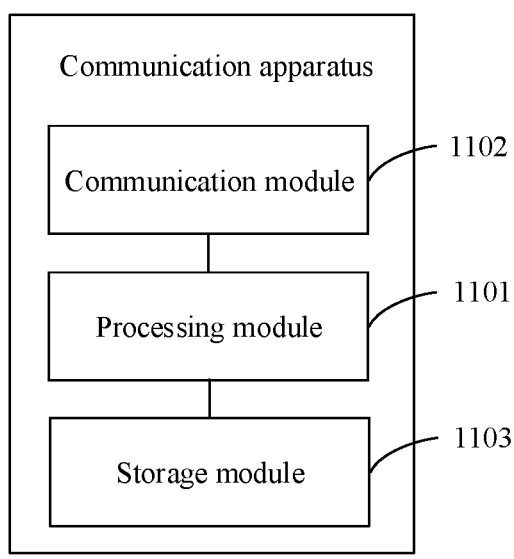

For example, when an integrated unit is used, FIG. 11 is a schematic diagram of a structure of a communication apparatus according to an embodiment of this application. In FIG. 11, the communication apparatus includes a processing module 1101 and a communication module 1102. The processing module 1101 is configured to control and manage actions of the communication apparatus, for example, perform the step performed by the processing unit 1001, and/or is configured to perform another process of the technology described in this specification. The communication module 1102 is configured to perform the step performed by the communication unit 1002, and support interaction between the communication apparatus and another device, for example, interaction with another network device apparatus. As shown in FIG. 11, the communication apparatus may further include a storage module 1103. The storage module 1103 is configured to store program code and data of the communication apparatus.

When the processing module 1101 is a processor, the communication module 1102 is a transceiver, and the storage module 1103 is a memory, the communication apparatus is the communication apparatus shown in FIG. 4B.

An embodiment of this application provides a computer-readable storage medium. The computer-readable storage medium stores instructions. The instructions are used to perform the method shown in FIG. 5.

An embodiment of this application provides a computer program product including instructions. When the computer program product runs on a communication apparatus, the communication apparatus is enabled to perform the method shown in FIG. 5.

A wireless communication apparatus according to an embodiment of this application stores instructions. When the wireless communication apparatus runs on the communication apparatuses shown in FIG. 4A, FIG. 4B, and FIG. 8 to FIG. 11, the communication apparatus is enabled to perform the method shown in FIG. 5. The wireless communication apparatus may be a chip.

An embodiment of this application further provides a communication system, including a terminal device and a network device. For example, the terminal device may be the communication apparatus shown in FIG. 4A, FIG. 8, or FIG. 9, and the network device may be the communication apparatus shown in FIG. 4B, FIG. 10, or FIG. 11.

According to the foregoing description of the implementations, a person skilled in the art may clearly understand that, for the purpose of convenient and brief description, only division into the foregoing function modules is used as an example for description. In actual application, the foregoing functions may be allocated to different function modules and implemented based on a requirement. To be specific, an inner structure of a database access apparatus is divided into different function modules to implement all or some of the functions described above.

The processor in embodiments of this application may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, an SoC may include the processor and another circuit (for example, an encoding/decoding circuit, a hardware acceleration circuit, or various buses and interface circuits). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

In this application, "at least one" refers to one or more. "A plurality of" means two or more than two. The term "and/or" describes an association relationship between associated objects and represents that three relationships may exist. For example, A and/or B may represent the following three cases: Only A exists, both A and B exist, and only B exists. A and B may be in a singular or plural form. The character "/" usually indicates an "or" relationship between the associated objects. "At least one of the following" or a similar expression thereof indicates any combination of the items, and includes a singular item or any combination of plural items. For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

In the several embodiments provided in this application, it should be understood that the disclosed database access apparatus and method may be implemented in other manners. For example, the foregoing database access apparatus embodiment is merely an example. For example, division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on an actual requirement to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing description is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, wherein the method comprises:
   receiving, by a first terminal device, a first message from a network device, wherein the first message comprises first information and second information, the first information is used to indicate a first search space, the second information is used to indicate a first cooperation group identifier, and a first cooperation group comprises the first terminal device and a second terminal device; and
   obtaining, by the first terminal device, first control information from the first search space based on the first information and the second information, including performing, according to a downlink control information (DCI) format contained in the first information, blind detection on control channel elements (CCEs) occupied by the first search space which is specific to the first cooperation group, and wherein the first control information is used to schedule downlink data of the second terminal device.

2. The method according to claim 1, wherein the method further comprises:
   receiving, by the first terminal device, the downlink data of the second terminal device from the network device based on the first control information; and
   forwarding, by the first terminal device, the downlink data to the second terminal device.

3. The method according to claim 1, wherein the first search space is a common search space.

4. The method according to claim 1, wherein the second information is associated with the first search space.

5. The method according to claim 1, wherein the obtaining, by the first terminal device, first control information from the first search space based on the first information and the second information comprises:
   receiving, by the first terminal device in the first search space indicated by the first information, the first control information scrambled by using the first cooperation group identifier; and
   descrambling, by the first terminal device based on the second information, the first control information scrambled by using the first cooperation group identifier.

6. The method according to claim 1, wherein a format of the first control information is specific to a cooperation transmission.

7. The method according to claim 6, wherein the first message further comprises third information, and the third information is used to indicate a control information format specific to the cooperation transmission.

8. The method according to claim 1, wherein the first cooperation group identifier is a radio network temporary identifier (RNTI), and the first cooperation group identifier is different from an RNTI of the first terminal device and an RNTI of the second terminal device; or the first cooperation group identifier is an RNTI that is the same as an RNTI of the second terminal device.

9. The method according to claim 1, wherein the first information comprises a first offset and information about a common search space, and the first offset is an offset between the first search space and the common search space.

10. A communication method, wherein the method comprises:
determining, by a network device, first information and second information, wherein the first information is used to indicate a first search space, the second information is used to indicate a first cooperation group identifier, and a first cooperation group comprises a first terminal device and a second terminal device;
sending, by the network device, a first message to the first terminal device, wherein the first message comprises the first information and the second information; and
sending first control information by using the first search space, wherein the first control information is used to schedule downlink data of the second terminal device, and wherein the first control information is obtained through blind detection on control channel elements (CCEs) occupied by the first search space, according to a downlink control information (DCI) format contained in the first information, wherein the first search space is specific to the first cooperation group.

11. The method according to claim 10, wherein the first search space is a common search space.

12. The method according to claim 10, wherein the second information is associated with the first search space.

13. The method according to claim 10, wherein a format of the first control information is specific to a cooperation transmission.

14. The method according to claim 13, wherein the first message further comprises third information, and the third information is used to indicate a control information format specific to the cooperation transmission.

15. The method according to claim 10, wherein the first information comprises a first offset and information about a common search space, and the first offset is an offset between the first search space and the common search space.

16. A communication apparatus, comprising:
a transceiver, configured to receive a first message from a network device, wherein the first message comprises first information and second information, the first information is used to indicate a first search space, the second information is used to indicate a first cooperation group identifier, and a first cooperation group comprises a first terminal device and a second terminal device; and
a processor, configured to obtain first control information from the first search space based on the first information and the second information, including performing, according to a downlink control information (DCI) format contained in the first information, blind detection on control channel elements (CCEs) occupied by the first search space, wherein the first search space is specific to the first cooperation group, and wherein the first control information is used to schedule downlink data of the second terminal device.

17. The apparatus according to claim 16, wherein:
the processor is further configured to receive the downlink data of the second terminal device from the network device by using the transceiver based on the first control information; and
the transceiver is further configured to forward the downlink data to the second terminal device.

18. The apparatus according to claim 16, wherein the processor is specifically configured to receive, by using the transceiver in the first search space indicated by the first information, the first control information scrambled by using the first cooperation group identifier; and
the processor is further configured to descramble, based on the second information, the first control information scrambled by using the first cooperation group identifier.

19. The apparatus according to claim 16, wherein the first message further comprises third information, and the third information is used to indicate a control information format specific to a cooperation transmission.

20. The apparatus according to claim 16, wherein the first cooperation group identifier is a radio network temporary identifier (RNTI), and the first cooperation group identifier is different from an RNTI of the first terminal device and an RNTI of the second terminal device; or
the first cooperation group identifier is an RNTI that is the same as an RNTI of the second terminal device.

* * * * *